(12) United States Patent
Wu et al.

(10) Patent No.: US 10,270,158 B2
(45) Date of Patent: Apr. 23, 2019

(54) WEARABLE ELECTRONIC DEVICE

(71) Applicant: PEGATRON CORPORATION, Taipei (TW)

(72) Inventors: Chien-Yi Wu, Taipei (TW); Chao-Hsu Wu, Taipei (TW); Shih-Keng Huang, Taipei (TW); Ya-Jyun Li, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 15/669,980

(22) Filed: Aug. 7, 2017

(65) Prior Publication Data

US 2018/0062245 A1    Mar. 1, 2018

(30) Foreign Application Priority Data

Sep. 1, 2016 (TW) .............................. 105128280 A (51) Int. Cl.
| | |
|---|---|
| H01Q 1/24 | (2006.01) |
| H01Q 5/30 | (2015.01) |
| H01Q 1/27 | (2006.01) |
| H01Q 9/28 | (2006.01) |
| H01Q 9/42 | (2006.01) |
| H04B 1/3827 | (2015.01) |

(52) U.S. Cl.
CPC ............ *H01Q 1/243* (2013.01); *H01Q 1/273* (2013.01); *H01Q 5/30* (2015.01); *H01Q 9/28* (2013.01); *H01Q 9/42* (2013.01); *H04B 1/385* (2013.01); *H04B 2001/3861* (2013.01)

(58) Field of Classification Search
CPC .......... H01Q 1/243; H01Q 1/273; H01Q 9/42; H04B 2001/3861

USPC .......................................................... 343/702
See application file for complete search history.

(56) References Cited

U.S. PATENT DOCUMENTS

| | | | | |
|---|---|---|---|---|
| 9,641,203 B2* | 5/2017 | Azuma | ............... | H04B 1/0458 |
| 9,673,507 B2* | 6/2017 | Ramachandran | ...... | H01Q 1/243 |
| 2015/0070226 A1* | 3/2015 | Wong | .................... | H01Q 1/273 |
| | | | | 343/718 |
| 2015/0311581 A1* | 10/2015 | Mo | ........................ | H01Q 1/243 |
| | | | | 343/702 |

(Continued)

FOREIGN PATENT DOCUMENTS

| | | |
|---|---|---|
| CN | 105487373 A | 4/2016 |
| TW | 201503484 A | 1/2015 |
| TW | 201507261 A | 2/2015 |

*Primary Examiner* — Peguy Jean Pierre
(74) *Attorney, Agent, or Firm* — McClure, Qualey & Rodack, LLP (57) ABSTRACT

A wearable electronic device is disclosed. Wearable electronic device includes a metal casing, a dielectric support part, a frame-shaped metal part, a dielectric sidewall and a first antenna wired circuit. The metal casing is electrically connected to the system ground. The dielectric support part is disposed on the metal casing. The frame-shaped metal part is disposed on the dielectric support part. One side of the frame-shaped metal part is electrically connected to the metal casing and another side of the frame-shaped metal part has a slot. The dielectric sidewall is surrounding within the metal casing. The first antenna wired circuit is disposed on the inner surface of the dielectric sidewall and insulated from the metal casing. The first antenna wired circuit is near the slot. The first antenna wired circuit and the frame-shaped metal part resonate a first resonant frequency band.

10 Claims, 6 Drawing Sheets

(56) References Cited

U.S. PATENT DOCUMENTS

2016/0006109 A1 1/2016 Apaydin et al.
2016/0064804 A1* 3/2016 Kim ..................... H01Q 1/243
　　　　　　　　　　　　　　　　　　　　　　　343/702

* cited by examiner

WEARABLE ELECTRONIC DEVICE

RELATED APPLICATIONS

This application claims priority to Taiwan Application Serial Number 105128280, filed Sep. 1, 2016, which is herein incorporated by reference.

BACKGROUND

Technical Field

The present disclosure relates to a wearable electronic device. More particularly, the present disclosure relates to a wearable electronic device with communication functions.

Description of Related Art

Intelligent equipments, such as smart phones, smart watches, exercise bracelet and tablet PCs and other products, have become an indispensable part of modern urban life, and these products are equipped with wireless communications. It is not easy to set an antenna in a down-sized device, such as a watch, and for the sake of beauty, intelligent equipments tend to be designed with all-metal casing, which causes a more difficult antenna installation.

In prior arts, many methods have been proposed to realize arrangements of antennas with various frequency bands. However, for down-sized intelligent devices, due to their limited sizes of spaces and/or areas, it is still a major challenge to arrange, for example, an antenna with 4G frequency bands or even lower frequency bands in the devices in present technology development.

SUMMARY

In some embodiments, a wearable electronic device is disclosed that includes a metal casing, a dielectric support part, a frame-shaped metal part, a dielectric sidewall, and a first antenna wired circuit. The metal casing is electrically connected to the system ground. The dielectric support part is disposed on the metal casing. The frame-shaped metal part is disposed on the dielectric support part, one side of the frame-shaped metal part is electrically connected to the metal casing and another side of the frame-shaped metal part has a slot. The dielectric sidewall surrounds within the metal casing. The first antenna wired circuit is disposed on the inner surface of the dielectric sidewall and is insulated from the metal casing. The first antenna wired circuit is near the slot, the first antenna wired circuit and the frame-shaped metal part resonate a first resonant frequency band.

In the present disclosure, a slot is set on the top of the wearable electronic device to enable a low frequency antenna, such as a 4G antenna frequency band, to be arranged in a miniaturized metal body of the device, and to make the wearable electronic device more flexible and efficient in space planning.

BRIEF DESCRIPTION OF THE DRAWINGS

This disclosure can be more fully understood by reading the following detailed description of the embodiment, with reference made to the accompanying drawings as follows.

DETAILED DESCRIPTION

The following disclosure is described in detail with the drawings, but the specific embodiments described are just used to illustrate the invention but not intended to limit the invention. The description of structural operations is not intended to limit the order of the execution, any device that is reassembled by the elements, resulting in devices with equal effect, are covered by the present disclosure.

In addition, the drawings are just for illustrative purpose but not drawn according to their original size. The term "coupled" may also be termed as "electrically coupled", and the term "connected" may be termed as "electrically connected". "Coupled" and "connected" may also be used to indicate that two or more elements cooperate or interact with each other.

Figure 1:
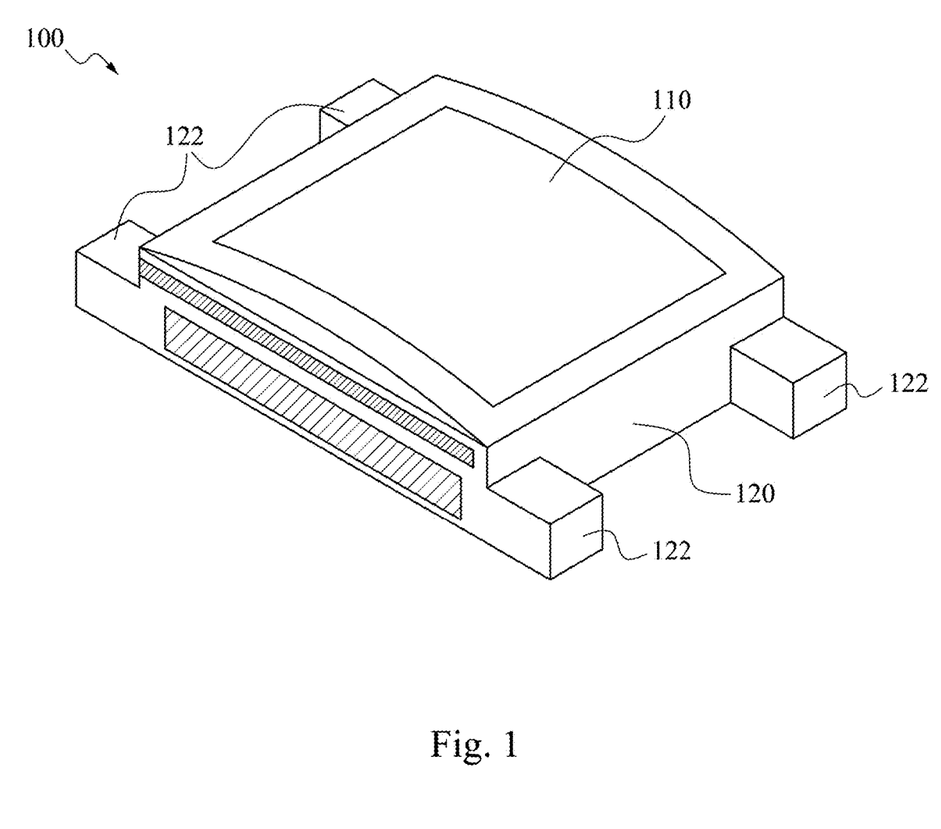
FIG. 1 is a schematic diagram of a wearable electronic device in accordance with an embodiment of the present disclosure.

Reference is now made to FIG. 1. FIG. 1 is a schematic diagram of a wearable electronic device 100 in accordance with an embodiment of the present disclosure. The wearable electronic device 100 can be any intelligent electronic device that requires communication function, in which, in this embodiment, a smart watch is used as an example for illustration. It should be noted that although the wearable electronic device 100 is shown as a device with square design in FIG. 1, the wearable electronic device 100 may be of any symmetrical or asymmetrical shape, and the present disclosure is not limited thereto.

The wearable electronic device 100 is mainly composed of two parts including a display panel 110 and a main structure 120. The display panel 110 is, for example, implemented on a surface of a watch. The main structure 120 is provided where components, including, for example, systems, antennas, and a connecting part 122 of the wearable electronic device 100, to be installed, in which the connecting part 122 is configured to be connected to a wearing part such as a watch band. For a detailed structure of the main structure 120, reference is made to FIG. 2A and FIG. 2B.

Figure 2A:
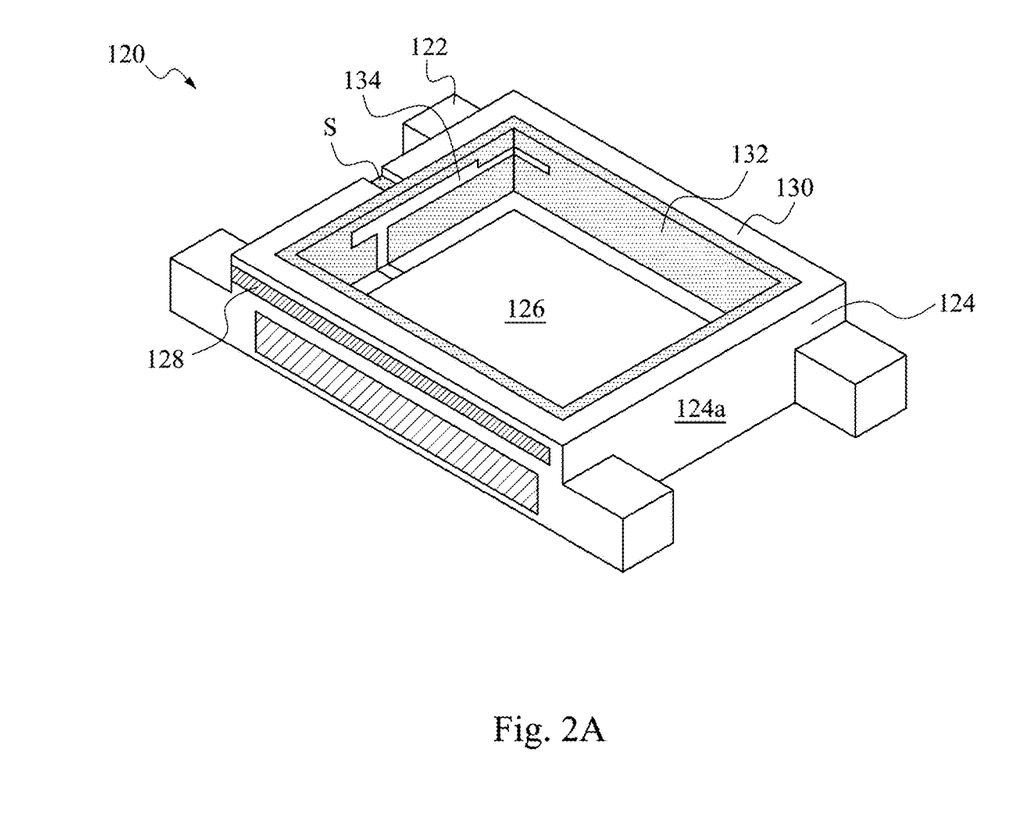
FIG. 2A is a schematic side view of a main structure of a wearable electronic device in accordance with an embodiment of the present disclosure.

FIG. 2A is a schematic side view of the main structure 120 of the wearable electronic device 100 in accordance with an embodiment of the present disclosure. As shown in FIG. 2A, the main structure 120 of the wearable electronic device 100 has a metal casing 124, and the metal casing 124 is electrically coupled to a system ground plane 126, such that the whole metal body is coupled to ground. A dielectric support part 128 is disposed above the metal casing 124, and a frame-shaped metal part 130 is disposed above the dielectric support part 128. The frame-shaped metal part 130 is a metal part surrounding the body of the wearable electronic device 100, which has a shape similar to a square, circular or any irregular shape. The frame-shaped metal part 130 can be, for example, a bezel of the display panel 110. The dielectric support part 128 is, for example, implemented by an insulating material such as plastic.

One side of the frame-shaped metal part 130 has a slot S, and the slot S is adjacent to one side, which is configured with the connecting part 122, of the metal casing 124. The other side, which is opposite to the slot S, of the frame-shaped metal part 130 is electrically coupled to a surface 124a of the metal casing 124, and is coupled to the system ground plane 126 through the metal casing 124, such that the frame-shaped metal part 130 has the effect of extending the ground plane. In this embodiment, the frame-shaped metal part 130 is connected to the surface 124a of the metal casing 124, but in various embodiments, the frame-shaped metal part 130 can also be indirectly coupled to the surface 124a in any other way.

A dielectric sidewall 132 is surroundingly disposed on an inner side of the metal casing 124. In this embodiment, the dielectric sidewall 132 is attached to each inner side of the metal casing 124. A first antenna wired circuit 134 is disposed on the inner side of the dielectric sidewall 132 and adjacent to the slot S. A structure of the first antenna wired circuit 134 will be discussed below in further details.

Figure 2B:
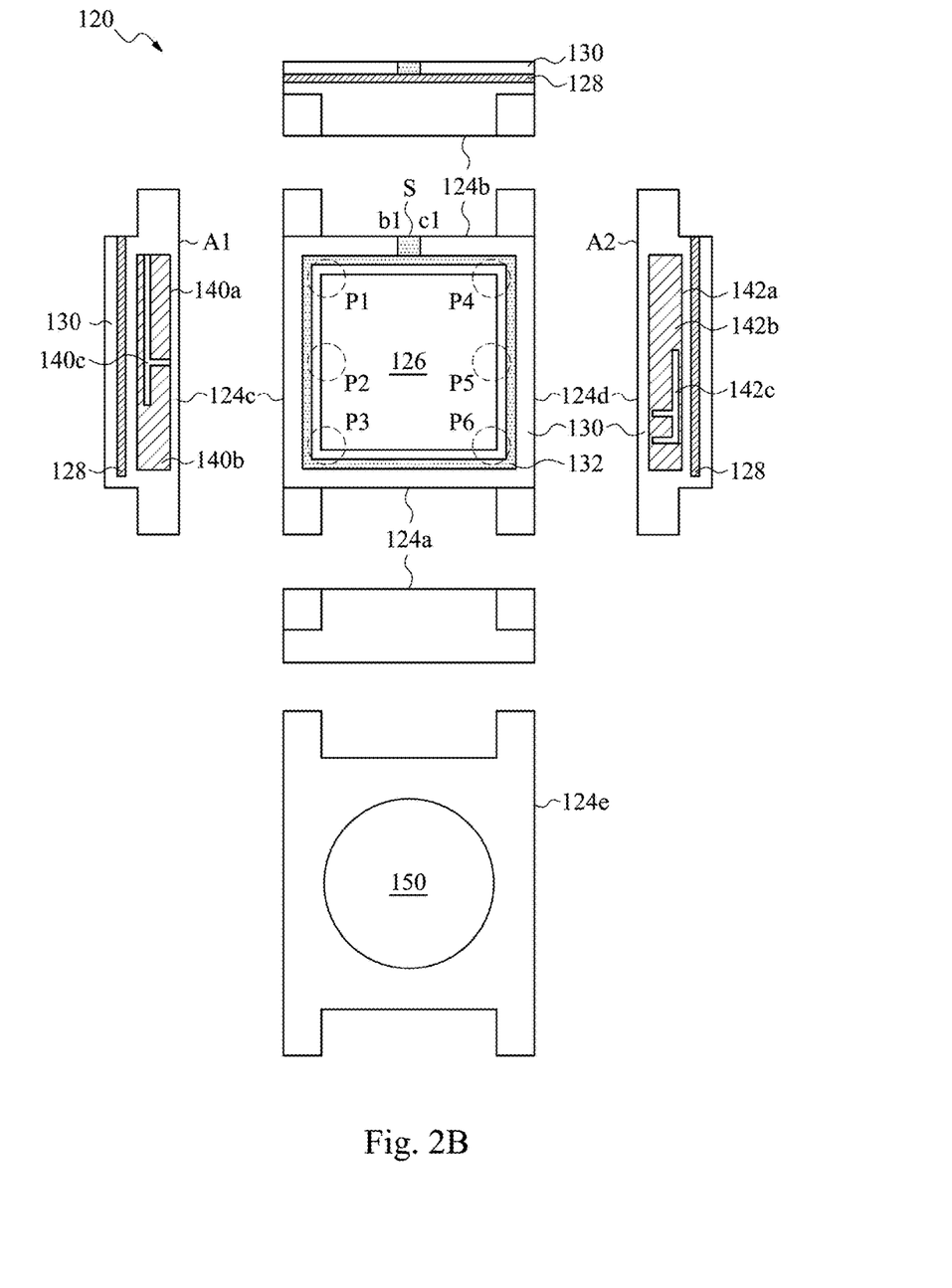
FIG. 2B is a schematic six-sided view of a main structure of a wearable electronic device in accordance with an embodiment of the present disclosure.

Reference is now made to FIG. 2B. FIG. 2B is a schematic six-sided view of the main structure 120 of the wearable electronic device 100 in accordance with an embodiment of the present disclosure. A top view of the main structure 120 is located at the center of FIG. 2B, which is a view from the top of the main structure 120. A front view is a view in front of the surface 124a of the metal casing 124. A back view is a view in front of a surface 124b of the metal casing 124. A left view is a view in front of a surface 124c of the metal casing 124. A right view is a view in front of a surface 124d of the metal casing 124. A bottom view is a view in front of a surface 124e of the metal casing 124.

As shown in the top view of the main structure 120 at the center of FIG. 2B, the system ground plane 126 and the metal casing 124 have six separate ground point P1-P6 to ensure that the ground plane of the wearable electronic device 100 is complete. It should be understood that the location and the number of the grounding points are not limited in the present disclosure, those skilled in the present art can also adjust the location and the number of the ground points in accordance with actual design requirements, and for the best case, the system ground surface 126 and the metal casing 124 are fully engaged.

In an embodiment, a length, a width, and a height of the main structure 120 of the wearable electronic device 100 can be 44 mm, 44 mm, 16 mm, respectively. A width (distance from a point b1 to a point c1) of the slot S is, for example, 2 mm. A thickness of the dielectric support part 128 is, for example, 2 mm. A width and a thickness and of the frame-shaped metal part 130 are both, for example, 2 mm. A thickness of the dielectric sidewall 132 is, for example, 1 mm. The left view, the back view and the right view of the main structure 120 of the wearable electronic device 100 in FIG. 2B can be used to determine that the dielectric support part 128 is, for example, an inverted U-shaped structure.

Figure 3:
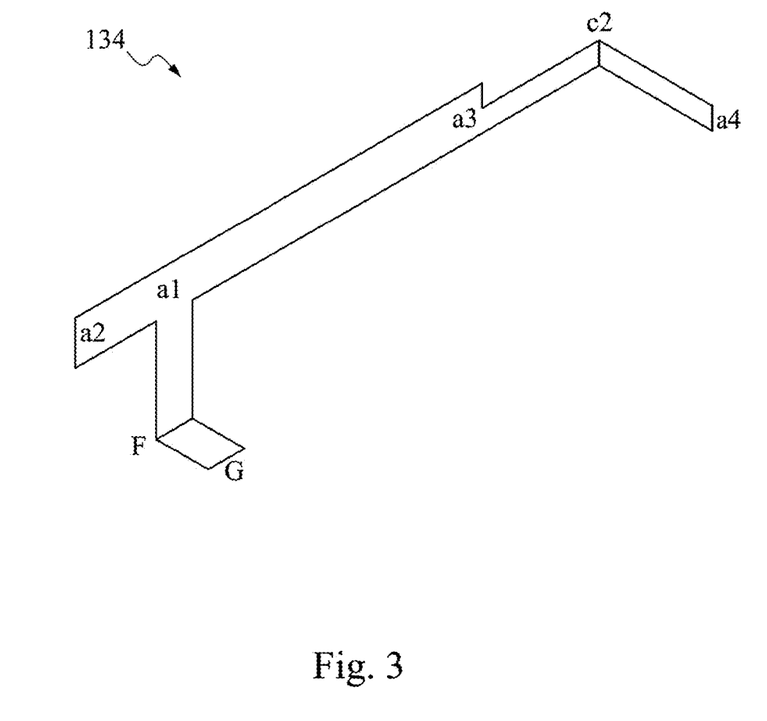
FIG. 3 is a schematic diagram of a first antenna wired circuit of a wearable electronic device in accordance with an embodiment of the present disclosure.

FIG. 3 is an enlarged schematic diagram of the first antenna wired circuit 134 of the wearable electronic device 100, as illustrated in the embodiments in FIG. 2A. The first antenna wired circuit 134 includes a first part starting from a point a1 to a point a2, and a second part starting from the point a1 to a point a4. For example, a length from the point a1 to the point a2 is 5 mm, a length from the point a1 to a point a3 is 25 mm, a length from the point a3 to a point c2 is 5.5 mm, and a length from the point c2 to the point a4 is 9 mm. A path formed by the points a1, a2, a3, and c2 is located on the side, which is adjacent to the surface 124b of the metal casing 124, of the dielectric sidewall 132. A path formed by the points c2 and a4 is located on the side, which is adjacent to the surface 124d of the metal casing 124, of the dielectric sidewall 132.

There is a path extending from the point a1 in order to set up a signal feed-in terminal F, in which the signal feed-in terminal F is configured to be coupled to a signal positive terminal of a wireless transceiver circuit (not shown). A ground terminal G is electrically coupled to a signal negative terminal of the wireless transceiver circuit (not shown), and is conducted with the system ground plane 126. Therefore, the wireless transceiver circuit can transmit and/or receive a wireless signal through the first antenna wired circuit 134. In general, since there is a gap between the system ground plane 126 and the metal casing 124, the path between the signal feed-in terminal F and the ground terminal G is disposed in the horizontal gap between the metal casing 124 and the system ground plane 126.

In this embodiment, the distance between the point a1 and the point b1 on the slot S is approximately 5 mm. The distance can be adjusted to control the degree of coupling between the first antenna wired circuit 134 and the slot S.

With the above configuration, the first antenna wired circuit 134 can perform a coupling resonance with the frame-shaped metal part 130, such that the wearable electronic device 100 is able to transmit and receive signals in the first resonant frequency band. The first resonant frequency band is, for example, 3G/4G antenna frequency band (approximately 700-960 MHz and 1710-2700 MHz).

It can be understood that the number of the slot S is not limited to one, and the number can be adjusted and designed according to actual requirements. In general, the number of the slot S is related to the number of antennas to transmit and receive signals through the frame-shaped metal part 130. The position of the slot S is not limited to the side (the surface 124a or 124b) adjacent to the connecting part 122. In one embodiment, the slot S can also be disposed on the other side (the surface 124c or 124d) which is not adjacent to the connecting part 122, and the frame-shaped metal part 130 and the metal casing 124 are electrically coupled at the side which is opposite to the slot S. For example, if the slot S is adjacent to the surface 124c, the frame-shaped metal part 130 can be electrically coupled to the surface 124d of the metal casing 124 to be grounded.

The length or the width of the first part starting from the point a1 to the point a2 of the first antenna wired circuit 134 is related to the frequency point position and the impedance matching bandwidth of the high frequency band of the first resonant frequency band. The length or the width of the second part starting from the point a1 to the point a4 is related to the frequency point position and the impedance matching bandwidth of the low frequency band of the first resonant frequency band. Therefore, those skilled in the present art can adjust the desired first resonant frequency band by adjusting the length or the width from the point a1 to the point a2 of the first antenna wired circuit 134 and/or the length or the width between the point a1, a3, and a4.

In the embodiment of FIG. 2B, the surface 124c of the metal casing 124 of the wearable electronic device 100 is a first sidewall A1, and the surface 124d is a second sidewall A2. A first groove 140a is disposed on the first sidewall A1, and the dimension of the first groove 140a is, for example, 40 mm×7 mm×2 mm. A first dielectric support part 140b is disposed in the first groove 140a, and a second antenna wired circuit 140c is disposed on the first dielectric support part 140b. The second antenna wired circuit 140c also has a signal feed-in terminal and a ground terminal (not shown) to be connected to the signal positive terminal and the signal negative terminal of the wireless transceiver circuit (not shown), respectively, to transmit and/or receive the wireless signal.

The second antenna wired circuit 140c can be disposed on one side, which faces the inner side of the metal casing 124, of the first dielectric support part 140b, or be disposed on the opposite side, which faces the inner side of the metal casing 124 (e.g. faces the outer side of the metal casing 124), of the first dielectric support part 140b. Alternatively, the second antenna wired circuit 140c can be disposed on both sides of the first dielectric support part 140b in accordance with the actual application requirements.

Since the first sidewall A1 is coupled to ground, the second antenna wired circuit 140c and the first side wall A1 form a closed antenna structure. The second resonant frequency band can be resonated and generated by the capacitive coupling effect of the second antenna wired circuit 140c with the first sidewall A1 surrounding the second antenna wired circuit 140c, such that the wearable electronic device 100 can transmit and receive wireless signals through the second resonant frequency band accordingly.

A path length of the second antenna wired circuit 140c and/or the distance between the second antenna wired circuit 140c and the ground terminal is related to the frequency point position of the second resonant frequency band. Therefore, the second resonant frequency band can be adjusted to generate, for example, a frequency band of a GPS antenna (approximately 1575 MHz) by changing the path length of the second antenna wired circuit 140c and/or the distance between the second antenna wired circuit 140c and the ground terminal. In addition, the distance between the second antenna wired circuit 140c and the first sidewall A1 is related to the impedance matching bandwidth of the second resonant frequency band. Therefore, the effect of adjusting the antenna impedance matching bandwidth can be achieved by changing the distance between the second antenna wired circuit 140c and the first sidewall A1.

In another embodiment of the present disclosure, a second groove 142a is disposed on the second sidewall A2, and the dimension of the second groove 142a is, for example, 40 mm×7 mm×2 mm. A second dielectric support part 142b is disposed in the second groove 142a, and a third antenna wired circuit 142c is disposed on the second dielectric support part 142b. The third antenna wired circuit 142c also has a signal feed-in terminal and a ground terminal (not shown) to be connected to the signal positive terminal and the signal negative terminal of the wireless transceiver circuit (not shown), respectively, to transmit and/or receive the wireless signal.

The third antenna wired circuit 142c can be disposed on one side, which faces the inner side of the metal casing 124, of the second dielectric support part 142b, or be disposed on the opposite side, which faces the inner side of the metal casing 124 (e.g. faces the outer side of the metal casing 124), of the second dielectric support part 142b. Alternatively, the third antenna wired circuit 142c can be disposed on both sides of the second dielectric support part 142b in accordance with the actual application requirements.

Since the second sidewall A2 is coupled to ground, the third antenna wired circuit 142c and the second side wall A2 form a closed antenna structure. The third resonant frequency band can be resonated and generated by the capacitive coupling effect of the third antenna wired circuit 142c with the second sidewall A2 surrounding the third antenna wired circuit 142c, such that the wearable electronic device 100 can transmit and receive wireless signals through the third resonant frequency band accordingly.

A path length of the third antenna wired circuit 142c is related to the frequency point position of the third resonant frequency band. Therefore, the third resonant frequency band can be adjusted to generate, for example, a frequency band of a Bluetooth/Wi-Fi antenna (approximately 2.4 GHz) by changing the path length of the third antenna wired circuit 142c. In addition, the distance between the third antenna wired circuit 142c and the second sidewall A2 is related to the impedance matching bandwidth of the third resonant frequency band. Therefore the effect of adjusting the antenna impedance matching bandwidth of the Bluetooth/Wi-Fi antenna can be achieved by changing the distance between the third antenna wired circuit 142c and the second sidewall A2.

In another embodiment of the present disclosure, a wireless charging device 150 can also be disposed on the surface 124e of the wearable electronic device 100, such that the wearable electronic device 100 is provided with a function of wireless charging.

According to the above embodiments, the wearable electronic device 100 can simultaneously transmit and receive antenna signals via the frame-shaped metal part 130 on the top surface and the sidewalls (A1, A2). At least three antennas can be configured simultaneously to have various antenna bands, including, for example, 3G/4G, GPS, Bluetooth/Wi-Fi and the like. Since the antenna is disposed on the top surface and sidewalls of the wearable electronic device 100, the space can be used more efficiently while the design of the metal body can be maintained to meet the SAR standard. In addition, since the metal casing 124 is coupled to the system ground plane 126, the material of the watch band has less effect on the efficiency of each antenna in the wearable electronic device 100, a watch band of, for example, a metallic material can also be used accordingly.

Figure 4:
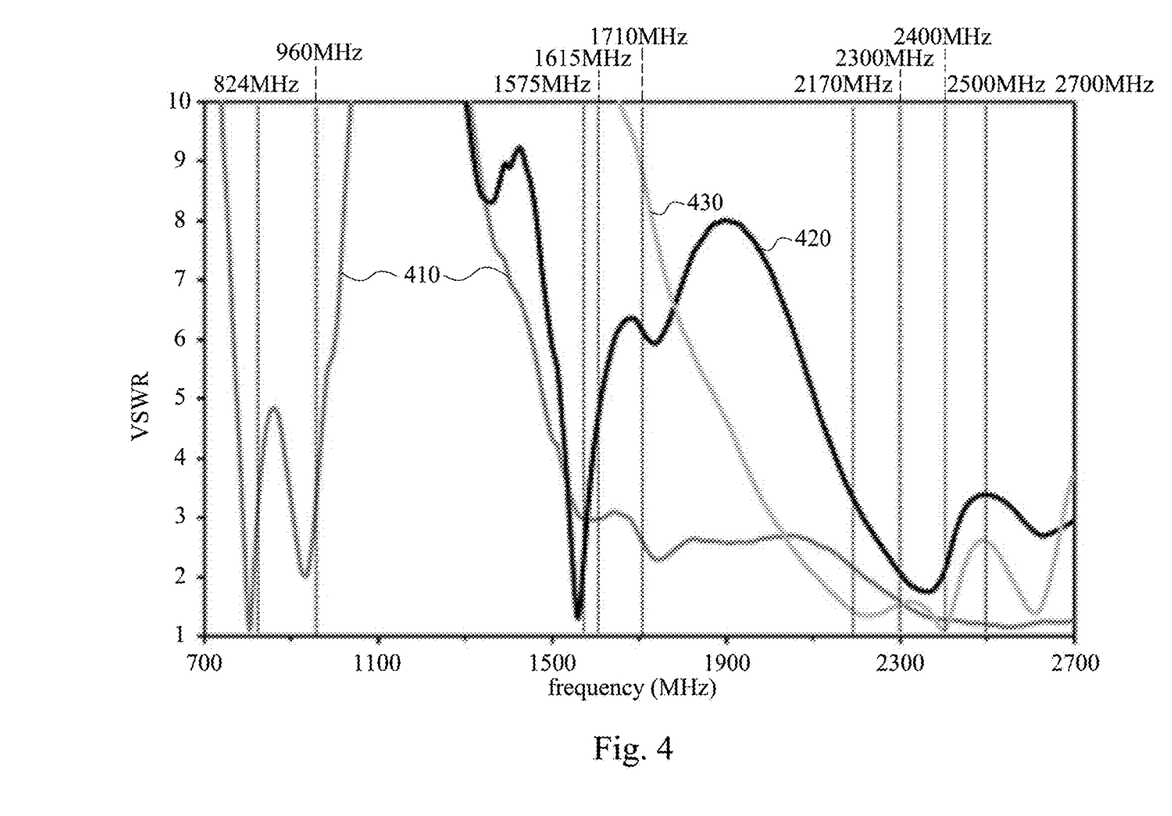
FIG. 4 is a diagram illustrating a relation between voltage standing wave ratio (VSWR) and the frequency of the antenna of the wearable electronic device according to an embodiment of the present disclosure.

FIG. 4 is a diagram illustrating a relation between voltage standing wave ratio (VSWR) and the frequency of the antenna of the wearable electronic device 100 according to an embodiment of the present disclosure. In FIG. 4, a unit on the vertical axis of the diagram is voltage standing wave ratio (VSWR) and a unit on the horizontal axis is frequency (MHz). The line segment 410 represents the voltage standing wave ratio of the 3G/4G antenna frequency band of the wearable electronic device 100. The line segment 420 represents the voltage standing wave ratio of the GPS antenna frequency band of the wearable electronic device 100. The line segment 430 represents the voltage standing wave ratio of the Bluetooth Wi-Fi antenna frequency band. As shown in FIG. 4, each antenna of the wearable electronic device 100 has a good impedance matching.

Figure 5:
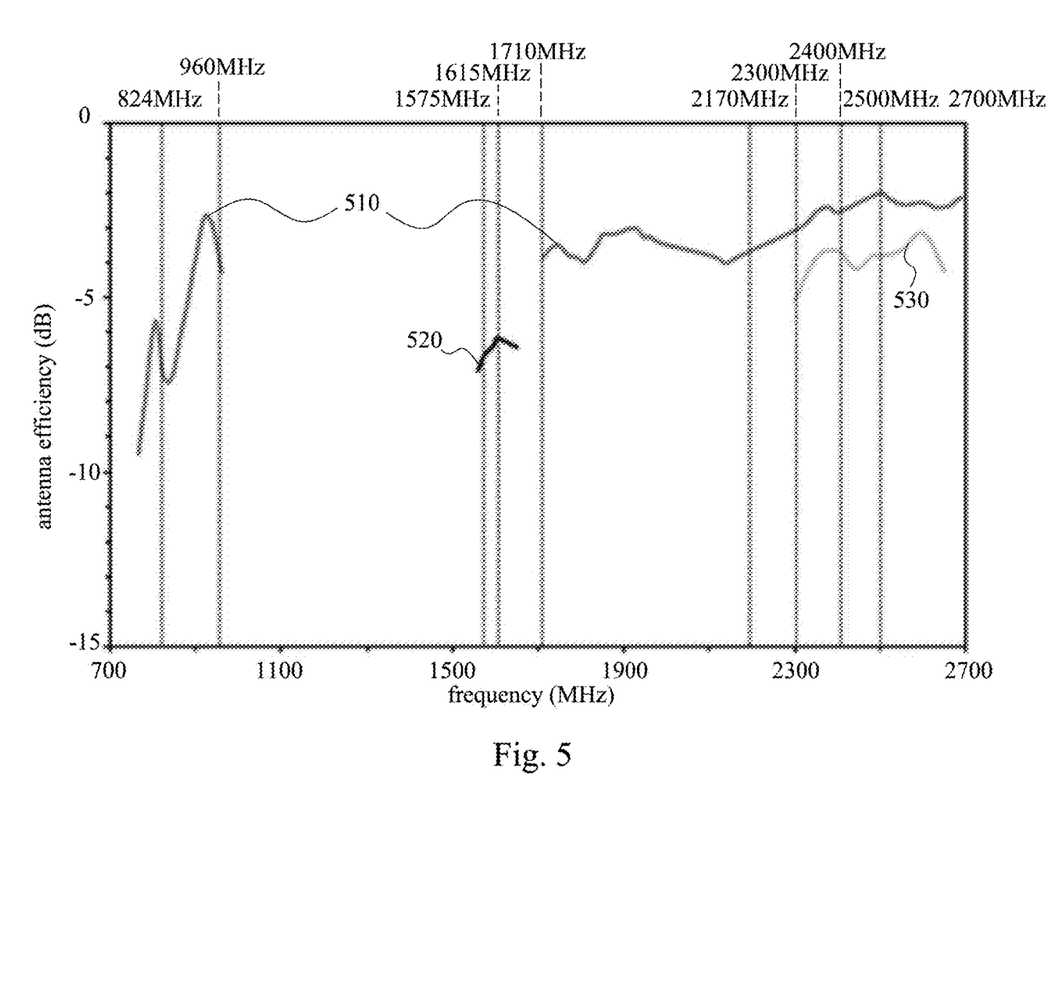
FIG. 5 is a diagram illustrating a relation between the antenna efficiency to the frequency of the antenna of the wearable electronic device according to an embodiment of the present disclosure.

FIG. 5 is a diagram illustrating a relation between the antenna efficiency and the frequency of the antenna of the wearable electronic device 100 according to an embodiment of the present disclosure. For illustration, FIG. 5 is a diagram illustrating a relation between the antenna efficiency (dB) and the frequency of the antenna of the wearable electronic device 100 in accordance with the actual application, where a unit on the vertical axis is dB value of the antenna efficiency, a unit on the horizontal axis is frequency (MHz). In FIG. 5, the line segment 510 represents the antenna efficiency of the 3G/4G antenna frequency band of the wearable electronic device 100, the line segment 510 represents the antenna efficiency of the GPS antenna frequency band of the wearable electronic device 100, the line segment

530 represents the antenna efficiency of the Bluetooth/Wi-Fi antenna frequency band of the wearable electronic device 100. As shown in FIG. 5, the wearable electronic device 100 disclosed in the present disclosure has a good antenna efficiency performance in each antenna frequency band.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wearable electronic device, comprising: a metal casing electrically coupled to a system ground; a dielectric support part disposed on the metal casing; a frame-shaped metal part disposed on the dielectric support part, wherein one side of the frame-shaped metal part is electrically coupled to the metal casing and another side of the frame-shaped metal part has a slot; a dielectric sidewall surroundingly disposed on an inner side of the metal casing; and a first antenna wired circuit disposed on an inner surface of the dielectric sidewall and insulated from the metal casing, the first antenna wired circuit being adjacent to the slot, the first antenna wired circuit and the frame-shaped metal part resonating a first resonant frequency band.

2. The wearable electronic device of claim 1, wherein the first antenna wired circuit comprises a first portion, a length or a width of the first portion is associated with a frequency point position and an impedance matching bandwidth of a high frequency band of the first resonant frequency band.

3. The wearable electronic device of claim 2, wherein the first antenna wired circuit further comprises a second portion, a length or a width of the second portion is associated with a frequency point position and an impedance matching bandwidth of a low frequency band of the first resonant frequency band.

4. The wearable electronic device of claim 1, further comprising a connecting part disposed at the metal casing and configured to be connected to a wearing part, wherein the slot of the frame-shaped metal part is adjacent to one side of the connecting part.

5. The wearable electronic device of claim 1, wherein the first resonant frequency band is a 4G antenna frequency band.

6. The wearable electronic device of claim 1, wherein the frame-shaped metal part is configured to receive a display panel.

7. The wearable electronic device of claim 1, wherein the metal casing comprises: a first groove disposed on a first sidewall of the metal casing; a first dielectric part disposed in the first groove; and a second antenna wired circuit disposed on the first dielectric part, the second antenna wired circuit and the first sidewall resonating a second resonant frequency band.

8. The wearable electronic device of claim 7, wherein the second resonant frequency band is GPS frequency band.

9. The wearable electronic device of claim 7, wherein the metal casing further comprises: a second groove disposed on a second sidewall, which is opposite to the first side wall, of the metal casing; a second dielectric part disposed in the second groove; and a third antenna wired circuit disposed on the second dielectric part, the third antenna wired circuit and the second sidewall resonating a third resonant frequency band.

10. The wearable electronic device of claim 9, wherein the third resonant frequency band is Bluetooth or Wi-Fi frequency band.

* * * * *